(12) United States Patent
English

(10) Patent No.: US 6,757,553 B1
(45) Date of Patent: Jun. 29, 2004

(54) BASE STATION BEAM SWEEPING METHOD AND APPARATUS USING MULTIPLE ROTATING ANTENNAS

(75) Inventor: Sean S. English, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/419,682

(22) Filed: Oct. 14, 1999

(51) Int. Cl.⁷ .................................................. H04Q 7/30
(52) U.S. Cl. .................... 455/562; 455/133; 455/277.1; 343/766
(58) Field of Search ................................. 455/561, 562, 455/103, 133, 136, 277.1; 342/158, 368, 374, 428, 430, 367; 343/757, 758, 766

(56) References Cited

U.S. PATENT DOCUMENTS

| | | | |
|---|---|---|---|
| 4,779,097 A | 10/1988 | Morchin | 342/368 |
| 4,901,307 A | 2/1990 | Gilhousen et al. | 370/18 |
| 5,056,109 A | 10/1991 | Gilhousen et al. | 375/1 |
| 5,101,501 A | 3/1992 | Gilhousen et al. | 455/33 |
| 5,109,390 A | 4/1992 | Gilhousen et al. | 375/1 |
| 5,280,472 A | 1/1994 | Gilhousen et al. | 370/18 |
| 5,442,627 A | 8/1995 | Viterbi et al. | 370/22 |
| 5,488,737 A | 1/1996 | Harbin et al. | 455/33.1 |
| 5,490,165 A | 2/1996 | Blakeney, II et al. | 375/205 |
| 5,504,773 A | 4/1996 | Padovani et al. | 375/200 |
| 5,506,865 A | 4/1996 | Weaver, Jr. | 375/205 |
| 5,513,176 A | 4/1996 | Dean et al. | 370/18 |
| 5,568,483 A | 10/1996 | Padovani et al. | 370/84 |
| 5,615,409 A * | 3/1997 | Forssen et al. | 455/562 |
| 5,697,052 A * | 12/1997 | Treatch | 455/20 |
| 5,809,401 A | 9/1998 | Meidan et al. | 455/63 |
| 5,859,612 A | 1/1999 | Gilhousen | 342/457 |
| 6,038,453 A | 3/2000 | Kuo et al. | 455/446 |
| 6,078,824 A * | 6/2000 | Sogo | 455/562 |
| 6,173,190 B1 * | 1/2001 | Usui | 455/562 |

FOREIGN PATENT DOCUMENTS

| | | |
|---|---|---|
| EP | 0265178 | 4/1995 |
| EP | 0660630 | 6/1995 |
| WO | 9210890 | 6/1992 |
| WO | 9944297 | 9/1999 |

* cited by examiner

*Primary Examiner*—William Trost
*Assistant Examiner*—Philip J. Sobutka
(74) *Attorney, Agent, or Firm*—Philip Wadsworth; Kent D. Baker; Byron Yafuso

(57) ABSTRACT

A method and apparatus for wireless communications wherein a base station transmits and receives wireless signals through multiple directional antennas mounted on a rotating antenna assembly. Signal beams from each directional antenna sweep in one angular direction through multiple sector coverage areas. As a signal beam crosses from one sector to another, the routing of forward and reverse link signals associated with that signal beam are switched from the sector it is exiting to the sector it is entering.

53 Claims, 7 Drawing Sheets

BASE STATION BEAM SWEEPING METHOD AND APPARATUS USING MULTIPLE ROTATING ANTENNAS

BACKGROUND OF THE INVENTION

I. Field of the Invention

The current invention relates to wireless communications. More particularly, the present invention relates to a novel apparatus for the use of beam sweeping techniques to provide greater capacity in a multi-user wireless communication system.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System", hereinafter referred to as IS-95. The CDMA system allows for wireless voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission," hereafter referred to as cdma2000 and incorporated by reference herein. Methods of transmitting user data (non-voice data) over fundamental and supplemental channels are disclosed in cdma2000.

In a CDMA system, a user communicates with the network through one or more base stations. For example, a user on a subscriber station communicates to a land-based data network by transmitting data on the reverse link to a base station. The base station receives the data and can route the data through a base station controller (BSC) to the land-based data network. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in copending U.S. Pat. No. 5,625,876, entitled "METHOD AND APPARATUS FOR PERFORMING HANDOFF BETWEEN SECTORS OF A COMMON BASE STATION, " assigned to the assignee of the present invention and incorporated by reference herein.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION, " assigned to the assignee of the present invention and incorporated by reference herein. In accordance with the IS-95 standard, the traffic data or voice data is partitioned into code channel frames of 20 milliseconds in duration with data rates as high as 14.4 Kbps (kilo-bits-per-second).

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system. An exemplary system for providing data services over a wireless link is described in copending U.S. patent application Ser. No. 08/963,386, entitled "METHOD AND APPARATUS FOR HIGHER RATE PACKET DATA TRANSMISSION, " now U.S. Pat. No. 6,574,211, issued on Jun. 3, 2003, which is assigned to the assignee of the present invention and included herein by reference.

In a CDMA communication system, capacity is maximized when the transmission energy of signals is kept to the minimum value that will satisfy reliability performance requirements. The reliability in reception of a signal depends on the carrier-to-interference ratio (C/I) at the receiver. Thus, it is desirable to provide a transmission power control system that maintains a constant C/I at a receiver. Such a system is described in detail in U.S. Pat. No. 5,056,109 (the '109 patent) entitled "Method and Apparatus for Controlling Transmission Power in a CDMA Cellular Telephone System, " assigned to the assignee of the present invention and incorporated by reference herein.

In the '109 patent, a closed loop power control system is described in which the C/I (referred to in the '109 patent as signal to noise ratio) is measured at the receiver and compared to a single threshold value. When the measured C/I exceeds the threshold, a power control command is sent requesting the transmitter to decrease its transmit power. Conversely, when the measured C/I falls lower than the threshold, a power control command is sent requesting the transmitter to increase its transmit power. Because the C/I is not the only factor that determines the reliability of reception of a signal, the '109 patent also describes an outer loop power control system that varies the threshold value in order to satisfy a target reliability.

It is well known that in cellular systems the carrier-to-interference ratio (C/I) of any given user is a function of the location of the user within the coverage area. In order to maintain a given level of service, TDMA and FDMA systems resort to frequency reuse techniques, i.e. not all frequency channels and/or time slots are used in each base station. In a CDMA system, the same frequency allocation is reused in every cell of the system, thereby improving the overall efficiency. The C/I that any given user's subscriber station achieves determines the information rate that can be supported for this particular link from the base station to the user's subscriber station.

It is also well known that much of the signal interference in a loaded CDMA system is caused by the loaded system's own transmissions, from both base stations and subscriber stations. Transmissions from a base station to subscriber stations, also referred to as forward link transmissions, cause interference within its own and neighboring cells. Transmissions from subscriber stations to base stations, also referred to as reverse link transmissions, cause interference to the reverse link transmissions of other subscriber stations. In order to maintain a C/I that allows reliable communications, base stations and subscriber stations in a loaded CDMA system transmit more power to overcome the interference. The capacity of the wireless communication channel limits the sum of the power transmitted on the forward and reverse links. Thus, the more power transmitted on the forward or reverse links for each subscriber station, the fewer subscriber stations the system can support. Therefore, there is a need to identify methods of decreasing the forward and reverse link power without sacrificing C/I.

SUMMARY OF THE INVENTION

The present invention provides an improved-capacity wireless system by employing beam steering techniques to decrease the required transmit power of base stations and subscriber stations in the system. A base station in the improved wireless system decreases the interference it causes to neighboring cells by transmitting forward link signals along narrow signal beams. Subscriber stations located in a neighboring cell or sector.

To improve the carrier-to-interference ration (C/I) on the forward and reverse links, base station designs have been proposed that utilize narrow, moving signal beams instead of or in addition to broad beam coverage of sectors. For example, such a base station might transmit signals to subscriber stations within its sectors using narrow signal beams that cover a fraction of each sector at any point in time.

Reverse link signals traveling within a signal beam suffer little interference from signals originating from outside the signal beam, because the latter is greatly attenuated by the directional antenna. Consequently, such reverse link signals may be transmitted at lower power than would be necessary with a broad signal beam, thus reducing interference to neighboring coverage areas.

On the forward link, transmitting through a narrow beam reduces the interference that a transmitting base station causes to neighboring coverage areas. When multiple base stations of a wireless communication system transmit through narrow signal beams, they reduce the average interference caused by each base station to its neighbors. This reduction in interference allows forward link signals to be transmitted reliably at lower power.

As described above, enabling reliable communication with less transmission power allows increased capacity in a wireless communication system. Therefore, a method and apparatus that facilitates wireless communication through narrow beams is highly desirable. Additionally, methods of providing signal beams that sweep reliably and steadily through coverage areas are highly desirable. When a base station is divided into a conventional three-sectored configuration, it is desirable to have at least one signal beam sweeping through each sector at any given moment in time. Relatively uniform coverage is provided if such a signal beam always sweeps through the sector in the same direction.

In order for a signal beam to sweep in the same direction through a 120-degree sector area, the signal beam needs to be able to jump from one sector edge to the other after each sweep. In other words, the signal beam must sweep from one edge, through the sector coverage area, to the opposite edge and immediately begin sweeping again at the first edge. Such signal beam movement is possible with non-mechanical beam steering mechanism such as using a phased antenna array, but such non-mechanical methods are expensive and complex to implement. It is less expensive to use mechanical means to steer the signal beam, such as a rotating directional dish antenna. The problem with a physically rotating dish is that it is very difficult to make large, sudden beam angle changes, such as changing quickly from one edge of a 120-degree sector to the other.

The preferred embodiment of the present invention provides three signal beams that sweep steadily through each sector of a conventional three-sectored cell. The beams sweep in one direction, thus providing relatively uniform beam coverage of all parts of each sector. In the preferred embodiment, the three signal beams emanate from each of three directional dish antennas, mounted onto an antenna assembly such that each antenna is directed at approximately 120-degree angles from the others. When this antenna assembly is rotated in one direction at the center of a conventional three-sectored cell, the resulting three signal beams cross sector boundaries at the same time.

In the preferred embodiment, the base station equipment associated with forward and reverse link communication for each sector is connected to a signal switch. The signal switch routes forward and reverse link signals such of each sector through one of the three dish antennas at any instant in time. When the three signal beams sweep to the boundaries between sectors, the signal switch changes the routing of signals to and from the base station equipment for each sector to the dish antenna whose beam is just entering the sector. In other words, as each signal beam crosses from one sector into another sector, the signals for that beam are switched from the sector it is exiting to the sector it is entering. From the perspective of the base station equipment for a single sector, the sector's signal beam sweeps uniformly from one edge of the sector to the other, and immediately changes positions to the first edge of the sector again.

The sweeping of a signal beam is referred to herein as beam sweeping, and a base station employing beam sweeping techniques is referred to herein as a beam sweeping base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1A:
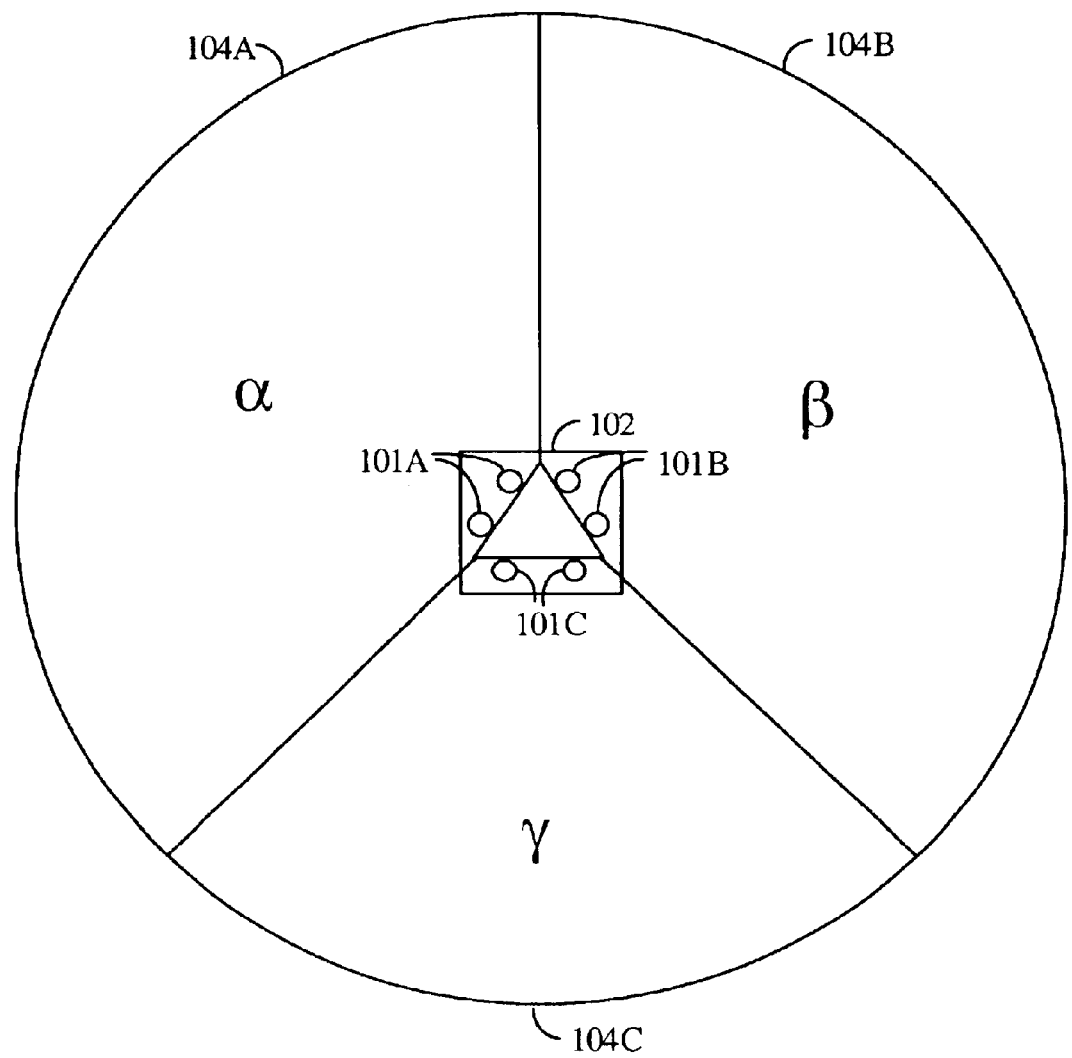
FIG. 1a is a diagram of a communication system with a sectorized base station that uses a broad beam antennas to provide broadcast coverage of signals in each sector in accordance with an embodiment of the present invention.

FIG. 1a is a diagram of a sectorized base station 102 that uses broad beam antennas 101 to provide broadcast coverage of signals of each sector 104 in accordance with an embodiment of the present invention. This conventional sectorized base station configuration serves as a starting point on which the preferred embodiment of the present invention is built. As with conventional sectorized CDMA base stations, broad coverage of a sector 104a is provided through two broad beam directional antennas 101a. In the conventional configuration, both antennas are used for reverse link diversity reception, and only one is used for forward link transmissions. In the preferred embodiment of the present invention, broad beam antennas 101 are used for signals in which narrow signal beams are not appropriate. Examples of CDMA signals that are best transmitted using a broad beam include pilot, sync, and fundamental channels.

Figure 1B:
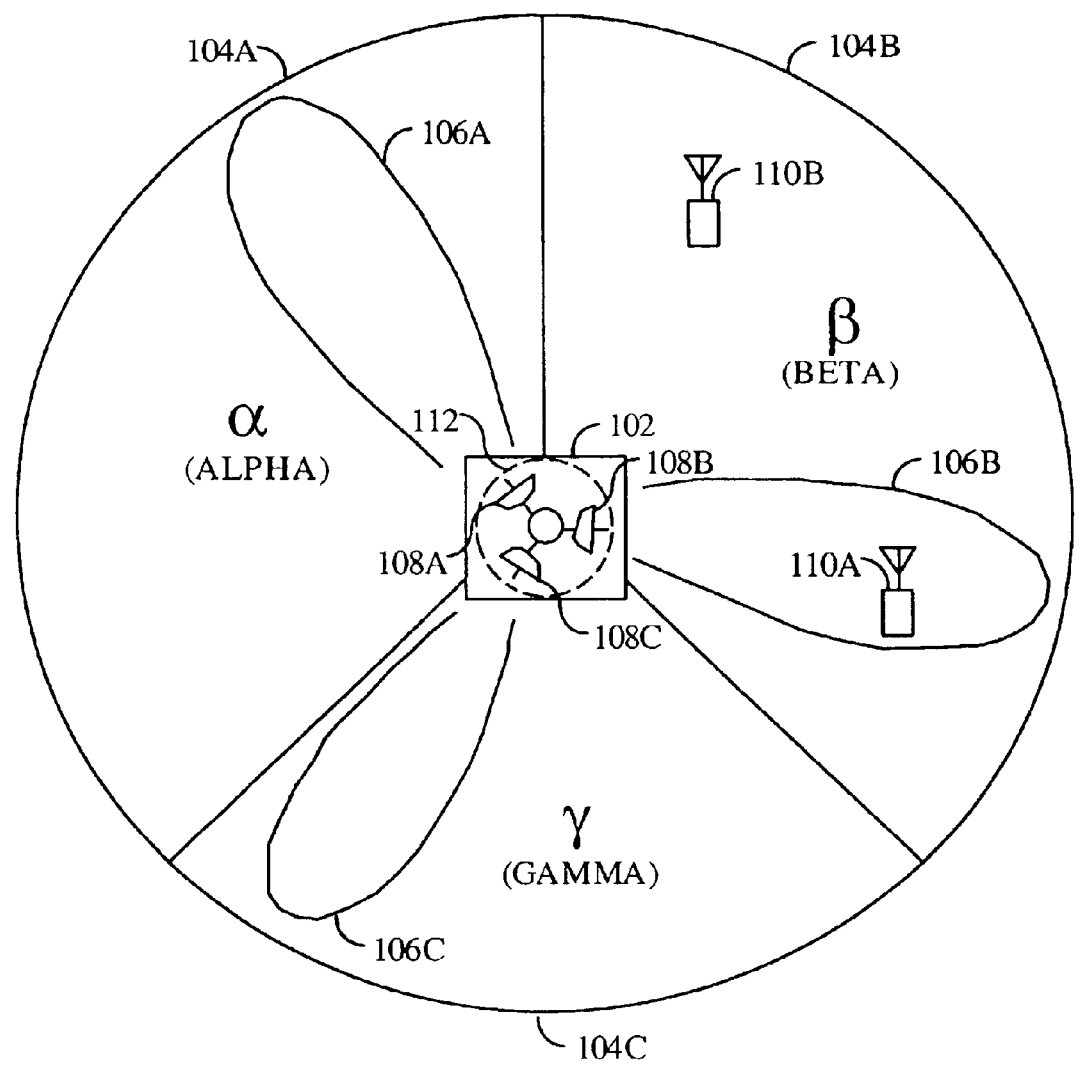
FIG. 1b is a diagram of a communication system with a sectorized beam sweeping base station that uses a triple beam antenna to transmit supplemental channel signals to subscriber stations in accordance with an embodiment of the present invention.

FIG. 1b is a diagram wherein base station 102 communicates wirelessly with subscriber stations 110 through triple beam antenna 112. Three directional antennas 108 are mechanically mounted to triple beam antenna 112. The three directional antennas 108 have radiation patterns 106 (also referred to herein as signal beams) directed radially outward from the center of triple beam antenna 112 at 120 degree angles from each other. Triple beam antenna 112 rotates such that one of the three signal beams 106 is always sweeping across each of three sector coverage areas 104.

In the example shown, both subscriber stations 110 are located within the coverage area of the beta sector 104b. Though the sweeping of the beams is just as effective in either direction, for the purposes of this discussion we will assume that the triple beam antenna 112 (also referred to herein as antenna assembly) rotates in a clockwise direction. Consequently, each signal beam sweeps through the sector alpha 104a, then beta 104b, then gamma 104c, before beginning again at alpha 104a. Each directional dish antenna 104 spends a third of the time pointing within each different sector 104.

In the figure, signal beam 106a is sweeping toward subscriber station 110b. As shown, subscriber station 110b is not within the coverage of any signal beam 106. Consequently, reliable signal transmission to or from subscriber station 110b requires a strong or high-power signal. When a high-power transmission is required to achieve a reliability level, the transmission is considered inefficient. In contrast, subscriber station 110a is located within signal beam 106b, and so may efficiently transmit and receive signals through triple beam antenna 112.

The preferred embodiment of the present invention is a CDMA system in which a combination of voice and data traffic is transmitted between base stations and subscriber stations. Voice traffic, being intolerant of delay, is transmitted using stationary, broad beam antennas 101, which broadly cover entire sectors 104. High speed data transmissions, such as Internet data, often utilizes error control protocols and is therefore more tolerant of delay. In cdma2000, voice traffic is transmitted through a fundamental channel, and non-voice data is transmitted using supplemental channels. In the preferred embodiment, pilot channel and fundamental channel signals are transmitted through broad beam antennas 101. Supplemental data is transmitted through triple beam antenna 112. In an alternate embodiment, base station 102 sends and receives supplemental data through a combination of broad beam antennas 101 and triple beam antenna 112.

When a signal is received through directional antenna 108b, transmissions from subscriber station 110b located outside signal beam 106b causes minimal interference to the signal transmitted by subscriber station 110a located within the signal beam 106b. Because of decreased interference from outside the narrow beam, subscriber station 110a can transmit its signal at lower power and still be reliably received at base station 102. This decrease in reverse link power leads to greater capacity in the cell coverage area of base station 102 as well as neighboring cells.

Transmitting through narrow signal beams also reduces the forward link power required for reliable reception. When signal beam 106a is relatively narrow, a greater portion of sector coverage area 104b falls outside the beam than falls within it. On average, then, base station 102 causes less interference to neighboring base stations. In a system wherein multiple base stations transmit supplemental channel signals on narrow signal beams, this decrease in forward link power leads to an increase in overall system capacity.

In the exemplary embodiment, directional antennas 108 are dish antennas having relatively narrow antenna radiation patterns 106. For example, an exemplary embodiment, each directional antenna 108 is a 30-degree half-power beam width antenna. The three directional antennas 108 are mechanically coupled onto a rotating assembly such that each antenna points in a direction approximately 120 degrees from each of the other antennas. The resulting assembly is a rotating triple beam antenna 112, which is mounted atop a motor (shown in later figures). The motor rotates triple beam antenna 112 continuously in one direction. As triple beam antenna 112 rotates, the antenna radiation patterns or signal beams 106 also rotate to cover three separate regions of the coverage area of base station 102. One skilled in the art will appreciate that the present invention is not limited to directional dish antennas. Alternative antenna types, such as collinear array antennas or phased array antennas may be mounted on the rotating platform to form each signal beam 106.

In addition, one skilled in the art will also appreciate that the present invention is not limited to three signal beams or directional antennas. Any number of signal beams or rotating directional antennas may be employed to cover a sector without departing from the present invention. Also, the use of a multiple beam antenna in accordance with the present invention allows variation of the shapes of sector coverage areas 104 without departing from the present invention. For example, alpha sector 104a may cover a 180 degree portion of the coverage of base station 102, while beta sector 104b and gamma sector 104c represent 90 degree sectors.

Figure 2A:
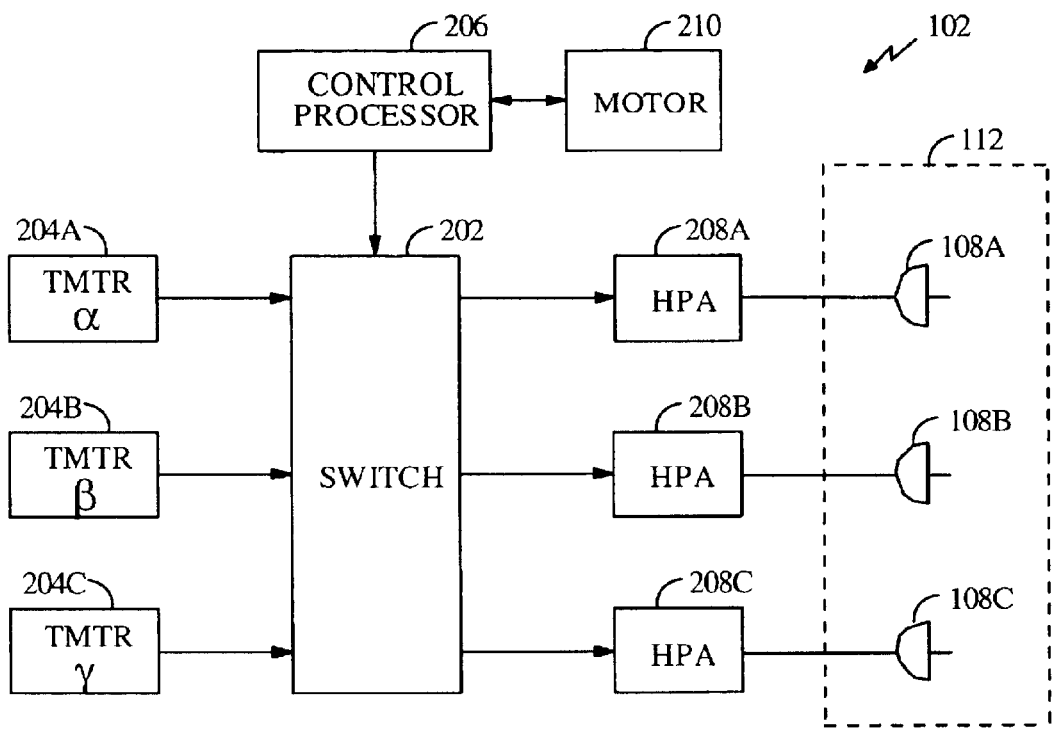
FIG. 2a is a diagram of a base station transmitter apparatus using a low power switch and a triple beam antenna configured in accordance with an embodiment of the present invention.

FIG. 2a is a diagram of a base station transmitter apparatus using a low power switch 202 and a triple beam antenna 112 configured in accordance with an embodiment of the present invention. In the exemplary embodiment shown, transmitter 204a corresponds to the alpha sector, transmitter 204b corresponds to the beta sector and transmitter 204c corresponds to the gamma sector. Each directional antenna 108 is connected to a high-powered amplifier (HPA) 208, which is then connected to signal switch 202. Triple beam antenna is mounted atop motor 210, which rotates triple beam antenna 112 continuously in one direction.

As triple beam antenna 112 rotates, the signal beam 106 of each directional antenna 108 sweeps through each of the three different sectors 104. Signal switch 202 directs signals from transmitter 204a such that they are always transmitted through a directional antenna 108 having a signal beam 106 in the alpha sector 104a. Likewise, signal switch 202 routes signals from transmitter 204b through whichever directional antenna 108 aimed at beta sector 104b, and routes signals from transmitter 204c through whichever directional antenna 108 aimed at gamma sector 104c. At the instant of time depicted in FIG. 1, for example, signals from transmitter 204a are routed through HPA 208a and antenna 108a such that they are transmitted through signal beam 106a located in alpha sector 104a. Signals from transmitter 204b are routed through HPA 208b and antenna 108b such that they are transmitted through signal beam 106b located in alpha sector 104b. Signals from transmitter 204c are routed through HPA 208c and antenna 108c such that they are transmitted through signal beam 106c located in alpha sector 104c.

Control processor 206 sends control signals to signal switch 202 indicating which transmitter signals should be routed to each HPA 108, and when the routing is to change. In the exemplary embodiment, the coverage area of base station 102 is divided evenly into three 120-degree sectors 104. Control processor 206 sends control signals to signal switch 202 such that the routing all three signals switches when all three signal beams 106 cross sector boundaries. With a triple beam antenna 112 wherein the three signal beams 106 are aimed 120 degrees apart from each other, the connections between all three transmitters 204 and the three HPA's 208 will switch at the same time.

In the exemplary embodiment, control processor 206 bases the timing of its control signals to signal switch 202 on the angular position of rotating triple beam antenna 112. Control processor 206 receives an angular position signal from motor 210. In the preferred embodiment, this angular position signal indicates to control processor 206 only when the sectors change and which antennas should be assigned to which sectors. For example, motor 210 might send a signal indicating when directional antenna 108a crosses the boundary between alpha and beta, beta and gamma, and gamma and alpha. Such information is sufficient for control processor 206 to appropriately adjust the routing of signals from all three transmitters 204 to all three HPA's 208.

In an alternate embodiment, motor 210 sends more detailed angular position information to control processor 206. Such signals allow control processor 206 to adjust the relative sizes of sectors 104. In the example described above, alpha sector 104a may cover a 180 degree portion of the coverage of base station 102, while beta sector 104b and gamma sector 104c represent 90 degree sectors. In an implementation using a triple beam antenna with beams spaced out 120 degrees from each other, this would mean that at certain times, beta sector 104b and gamma sector 104c would have no beam sweeping through them. Alpha sector 104a, however, would sometimes have two beams sweeping through it.

Motor 210 can be of any motor design capable of rotating antenna assembly 112. Motor 210 may sweep continuously or may step through predetermined angles of rotation. The design of motors capable of rotating an antenna assembly are well known in the art, any of which may be employed without departing from the scope of the present invention.

In another alternate embodiment, control processor 206 sends control signals to motor 210 to accelerate or decelerate its rotation speed. This acceleration or deceleration is based on any of several possible criteria including loading patterns within the coverage area of base station 102.

In another alternate embodiment, control processor 206 controls the routing of signal switch 202 without receiving angular position signals from motor 210. In this alternate embodiment, control processor 206 bases the routing of signals from sectors to antennas on criteria such as power control signals received from specific subscriber stations, or based on an internal timer in control processor 206. If an independent internal timer is used, the placement of the sectors 104 may move as a function of time, which may or may not be desirable.

Figure 2B:
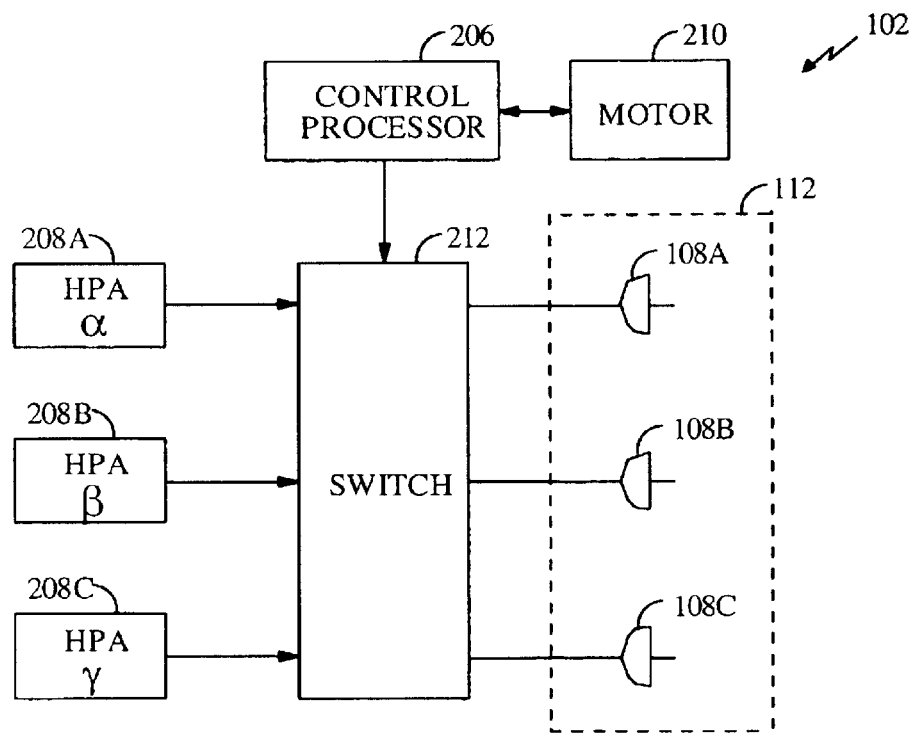
FIG. 2b is a diagram of a base station transmitter apparatus using a high power switch and a triple beam antenna configured in accordance with an embodiment of the present invention.

FIG. 2b is a diagram of an alternate embodiment using a high power switch 212 placed between HPA's 208 and directional antennas 108. Instead of routing low power signals from transmitters 204 through signal switch 202 to the inputs of HPA's 208, high power switch 212 routes the amplified outputs of HPA's 208 to antennas 108. The routing of signals from HPA's 208 to antennas 108 is based on the same signals from control processor 206 as described above. The resulting signals transmitted through antennas 105 in the apparatus of FIG. 2a is generally equivalent to that in the apparatus of FIG. 2b.

Figure 3:
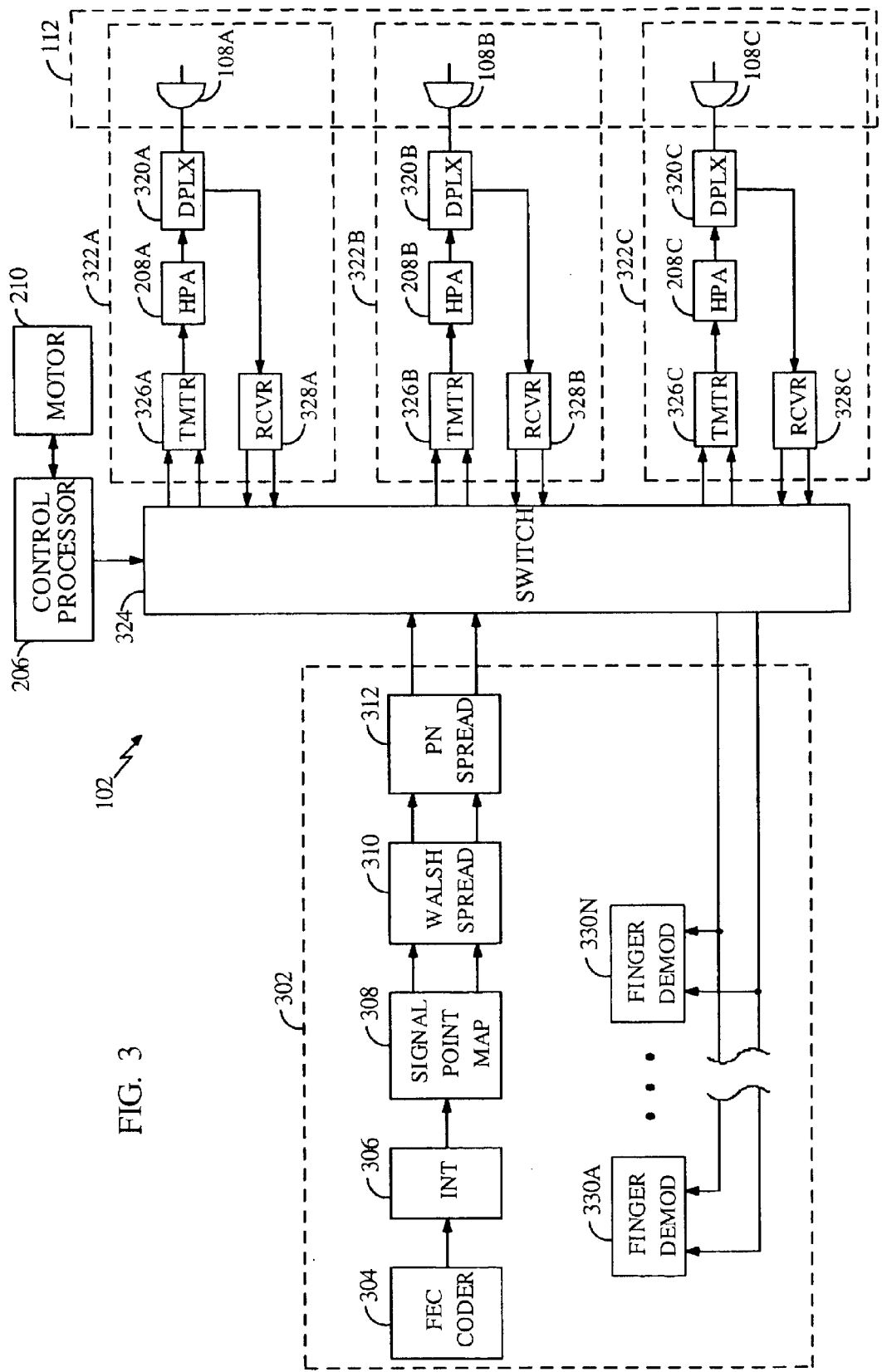
FIG. 3 is a block diagram of a CDMA base station apparatus using a triple beam antenna to cover one of three sectors configured in accordance with an embodiment of the present invention.

FIG. 3 is a block diagram of a CDMA base station apparatus for routing signals from one CDMA sector module 302 to an appropriate antenna transmission module 322 based on position of its signal beam 106. In the exemplary embodiment, digital signal switch 324 is bi-directional, and routes both forward link and reverse link digital signals between CDMA sector module 302 and the various antenna transmission modules 322, based on signals from control processor 206. In the exemplary embodiment, control processor 206 receives angular position information from motor 210.

Each antenna transmission module 322 includes a directional antenna 108 and a diplexer 320. The diplexer 320 allows the different frequency signals of the forward and reverse links to be fed through antenna 108 without interfering with each other. In the forward direction, complex digital signals from digital signal switch 324 are fed into transmitter 326, where the signals are modulated, converted to analog and upconverted to the RF carrier frequency. The upconverted analog signal from transmitter 326 is provided to HPA 208, which amplifies the signal and transmits it through diplexer 320 and antenna 108. Reverse link analog signals are received through antenna 108, fed through diplexer 320 and are then provided to receiver 328. In receiver 328, the reverse link signals are downconverted and sampled before being provided to digital signal switch 324.

CDMA sector module 302 processes forward and reverse link signals associated with a single sector 104. Forward link frames are provided to forward error correction (FEC) module 304, which encodes the frames based on an FEC code. FEC module 304 uses any of several forward error correction techniques, including turbo-coding, convolutional coding, or other form of soft decision or block coding. The resulting encoded frames are provided by FEC module 304 to interleaver 306, which interleaves the data to provide time diversity into the transmitted signal. Interleaver 306 utilizes any of a number of interleaving techniques, such as block interleaving and bit reversal interleaving. The output of interleaver 306 is binary, and is then provided to signal point mapping module 308, where the binary sample stream is converted into a stream of complex digital samples. The stream of complex digital samples is then spread with a Walsh channel code in Walsh spreader 310. In the preferred embodiment of the invention, the Walsh spreading performed by Walsh spreader 310 corresponds to a CDMA supplemental channel. After Walsh spreading, the output of Walsh spreader 310 is provided to pseudonoise (PN) spreader 312, where it is spread using PN codes. The output of PN spreader 308 is then provided to digital signal switch 324, where it is routed to one or more antenna transmission modules 322. Digital signal switch 324 also provides the complex reverse link sample stream to one or more CDMA finger demodulators 330, where the reverse link signals are PN despread, demodulated and decoded.

In the preferred embodiment, PN spreader 312 is a complex PN spreader that multiplies the complex output of Walsh spreader 310 by a complex PN code. In an alternate embodiment, PN spreader 312 multiplies the complex output of Walsh spreader 310 by a real (non-complex) PN code.

One skilled in the art will appreciate that signal point mapping module 308 may perform any of a variety of mapping functions without departing from the present invention. The mapping functions possibly employed in signal point mapping module 308 include binary phase-shift keying (BPSK), quadrature phase-shift keying (QPSK) or 8-ary phase-shift keying (8PSK).

The portions of CDMA sector module 302 shown in FIG. 3 enable wireless communication service in a single sector 104. As shown, digital signal switch 324 receives two forward link signals from PN spreader 312 and provides two reverse link signals to finger demodulators 330. Each pair of signals represents the real and imaginary components of a complex signal stream. The signal set of one forward link complex signal stream and one reverse link complex signal stream make up the signals associated with a single sector 104 that are switched in unison by digital signal switch 324. In other words, digital signal switch 324 always routes the forward link complex signal stream associated with a given sector to the same set of antenna transmission modules 322 as the reverse link complex signal stream associated with the same sector. Together, the forward link and reverse link signal streams for a single sector are called a sector signal stream. The connection used to carry a sector signal stream between digital signal switch 324 to the hardware or apparatus associated with the sector is called a sector connection.

In the preferred embodiment, CDMA sector module 302 includes additional hardware as appropriate to enable service in three sectors. For example, the forward link signal processing chain including FEC module 304, interleaver 306, signal point mapping module 308, Walsh spreader 310, and PN spreader 312 would be duplicated for each supported sector, with an additional set of complex signals being provided to digital signal switch 324 by PN spreader 312. A common pool of finger demodulators 330 is used to provide reverse link service for all three sectors. Each finger demodulator 330 has access to the three complex sample streams routed from each of the three antenna transmission module 322 by digital signal switch 324. This configuration allows signals transmitted by a single subscriber station 110 to be demodulated by multiple sectors using softer handoff techniques.

As discussed above, the number of sectors in the present invention is not limited to a maximum of three. Also, the number of sectors need not be the same as the number of antenna transmission modules 322. For example, in an alternate embodiment, six directional antennas are mounted at 60 degree angles from each other on a rotating assembly. In the alternate embodiment, base station 102 comprises six antenna transmission modules 322 providing service for three sectors 104. Control processor 206 causes digital signal switch 324 to route signals such that every sector 104 has exactly two beams 106 sweeping through it at any point in time.

Figure 4:
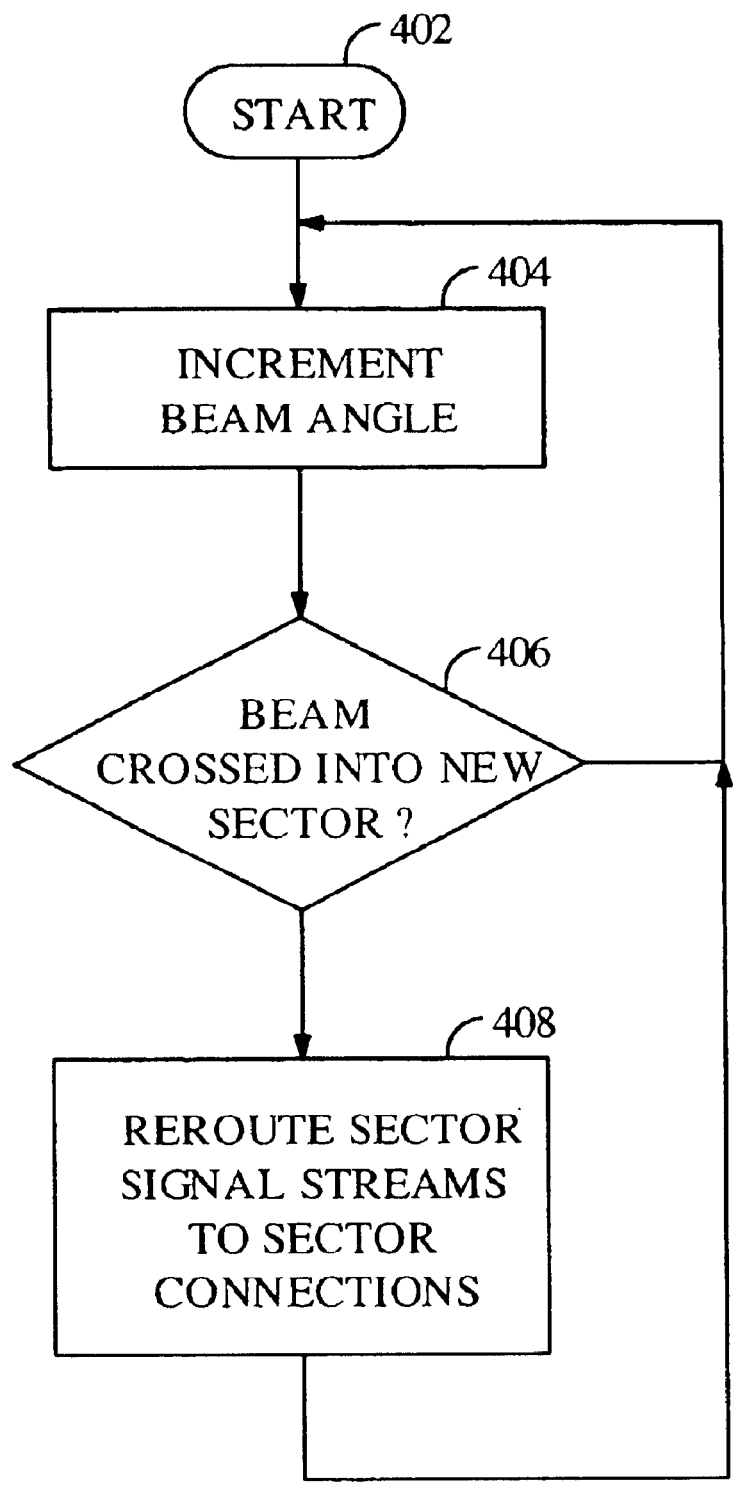
FIG. 4 is a flowchart of a method of adjusting routing of signals from multiple sectors to multiple antenna transmission subsystems in accordance with an embodiment of the invention.

FIG. 4 is a flowchart of a method of adjusting routing of signals from multiple sectors to multiple antenna transmission subsystems in accordance with an embodiment of the invention. At the start 402 of the flowchart, it is assumed that antenna assembly 112 is at an initial angular position, or beam angle. Also, sector signal streams, generally one per sector, are being routed through signal switch 324 to antenna transmit subsystems 322. The angular position, or beam angle, of antenna assembly 112 increments 404 as a result of the movement of motor 210.

In the exemplary embodiment, a decision 406 to change the routing of signals through signal switch 324 is based on whether the beam angle is indicative of a signal beam 106 sweeping out of one sector 104 and into another. For example, a new beam angle may indicate that signal beam 106b has swept from beta sector 104b into gamma sector 104c. If it is determined that a signal beam 104 has so crossed a sector boundary, the signals transmitted and received through antenna transmission subsystem 322 associated with that signal beam must be rerouted 408 to the appropriate sector connection of a CDMA sector module 302.

Once any necessary rerouting adjustments have been made in response to a beam angle change, the beam angle of antenna assembly 112 changes again.

Figure 5:
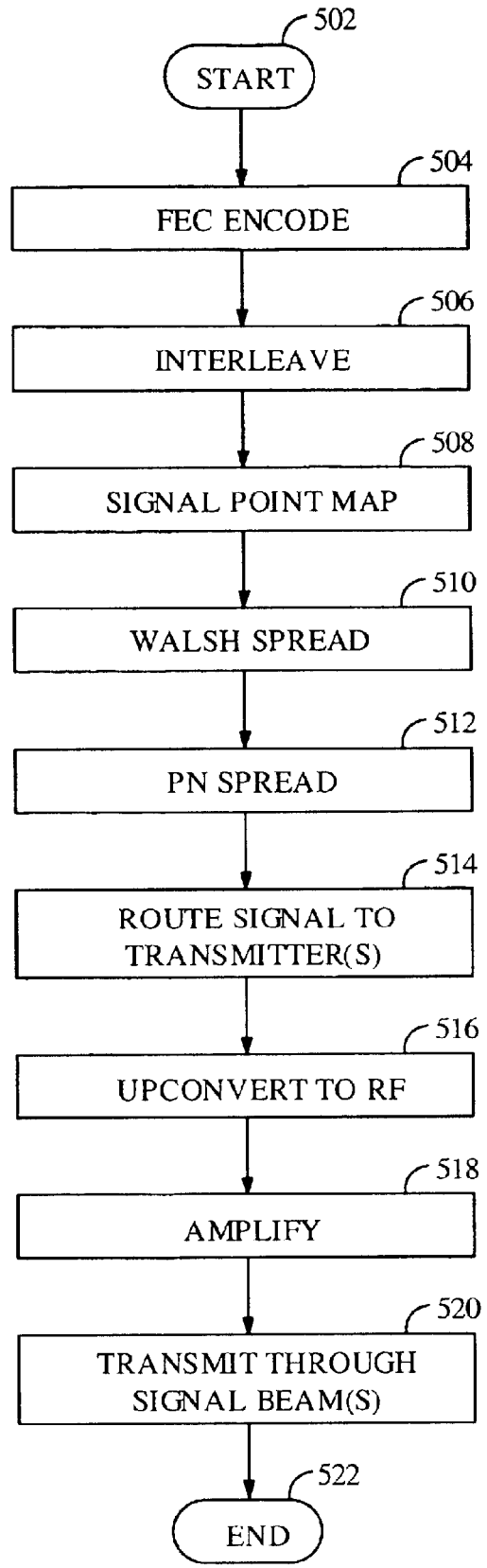
FIG. 5 is a flowchart of the steps of a method used to transmit signals in accordance with a preferred embodiment of the present invention.

FIG. 5 is a flowchart of the steps of a method used to transmit signals in accordance with a preferred embodiment of the present invention. The preferred embodiment is used in transmitting CDMA forward link signals from a base station using the antenna assembly 112 described above. Signals are generated prior to start step 502 and conclude 522 with their transmission 520 through one or more directional antennas 108 having signal beams 106.

Generated baseband data is forward error correction (FEC) encoded 504 and interleaved 506, as by FEC coder 304 and interleaver 306 described above. The resulting interleaved data is then mapped to complex values using signal point mapping 508, as by signal point mapping module 308. The resulting complex sample stream is spread 510 using Walsh spreading, as by Walsh spreader 310. The Walsh spread data is then spread using pseudonoise (PN) spreading 512, as with PN spreader 312. The PN spread signal stream is routed 514 to the appropriate transmitter or transmitters 326. Each of the routed signals are then upconverted to RF 516, as by transmitter(s) 326, and amplified 518, as by HPA(s) 208. The signals are then transmitted 520 through a signal beam(s) as through directional antenna(s) 108. As discussed above, different types of FEC encoding 504, interleaving 506, signal point mapping 508 and Walsh spreading 510 may be employed without departing from the present invention.

Figure 6:
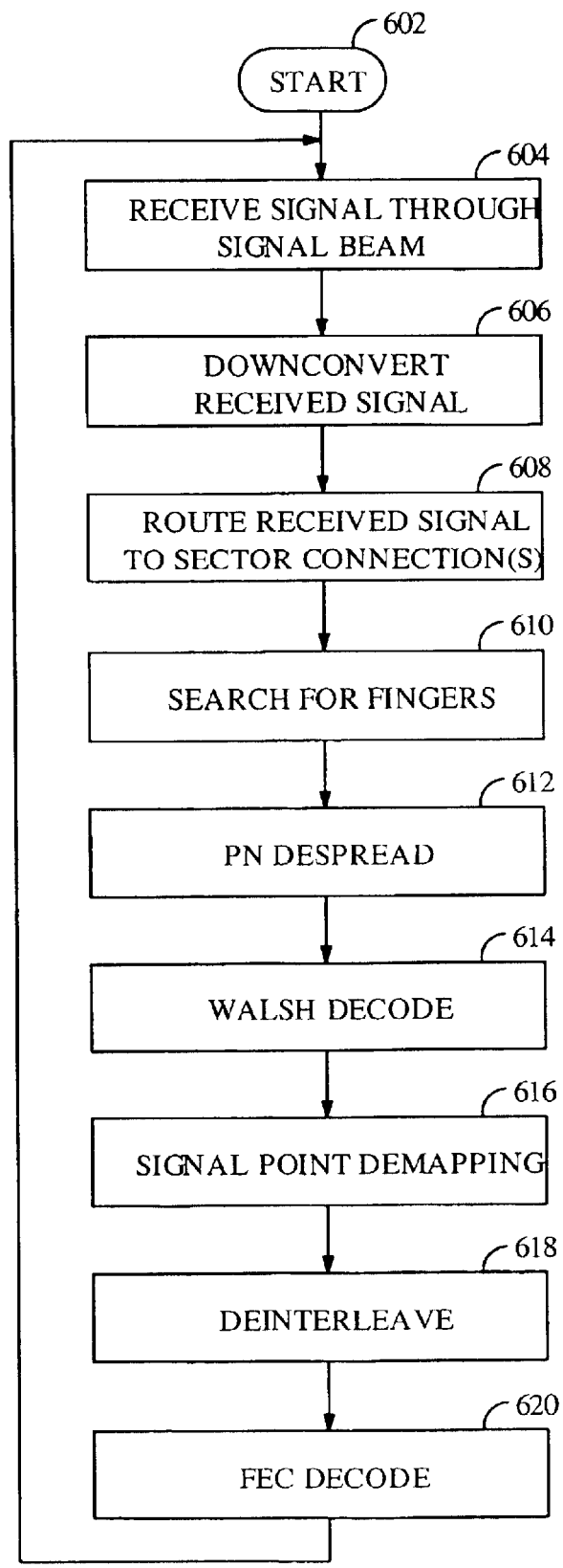
FIG. 6 is a flowchart of the steps of a method used to receive signals in accordance with a preferred embodiment of the present invention.

FIG. 6 is a flowchart of the steps of a method used to receive signals in accordance with a preferred embodiment of the present invention. The preferred embodiment is used by a CDMA base station configured in accordance with the preferred embodiment to receive and decode reverse link signals through antenna assembly 112 described above.

Signals are received 604 through one or more signal beams 106, as through directional antenna(s) 108. The received signals are downconverted 606 from RF to baseband, as by receiver 328. The downconverted signals are then routed 608 to one or more finger demodulators 330 through one or more sector connections.

Within each finger demodulator 330, CDMA techniques are used to decode CDMA data frames. These techniques include searching 610 for received signal fingers, PN despreading 612 the one or more fingers located, Walsh decoding 614 the PN despread signal, and demapping 616 the resulting complex sample stream into a binary data stream. The demapped binary stream is deinterleaved 618, and decoded 620 using forward error correction (FEC) techniques to determine the validity of received frames. With the receipt of one or more valid frames, the process continues as additional signals are received 604.

As with forward link transmissions, the steps listed may be performed using a variety of available techniques without departing from the present invention. For example, the PN despreading and Walsh despreading in steps 612 and 614 may be real or complex. The signal point demapping 616 may use any of a variety of mappings including binary phase-shift keying (BPSK), quadrature phase-shift keying (QPSK) or 8-ary phase-shift keying (8PSK). Deinterleaving step 618 may use any of a variety of interleaving techniques, such as such as block interleaving and bit reversal interleaving. FEC decoding step 620 may use any of a variety of decoding techniques such as turbo-coding, convolutional coding, or other form of soft decision or block coding.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. Wireless communication base station comprising:
    an antenna assembly comprising a first predetermined number of directional antennas, wherein said first predetermined number of directional antennas are assembled into said antenna assembly such that the radiation pattern of each said antenna is directed radially outward from the center of said antenna assembly;
    a motor, mechanically connected to said antenna assembly, for rotating said antenna assembly continuously in one direction about its axis; and
    a signal switch for routing signals between each of said directional antennas and a second predetermined number of sector connections.

2. The base station of claim 1 further comprising broad beam antenna for transmitting a pilot channel signal, wherein said pilot channel signal is transmitted coherently with respect to signals transmitted through said antenna assembly.

3. The base station of claim 1 wherein said signal switch is a digital signal switch.

4. The base station of claim 1 wherein said directional antennas are 30-degree half-power antennas.

5. The base station of claim 1 wherein said directional antennas are dish antennas.

6. The base station of claim 1 wherein said directional antennas are collinear array antennas.

7. The base station of claim 1 wherein said first predetermined number is greater than three.

8. The base station of claim 1 further comprising high power amplifier for amplifying an analog RF signal to produce an amplified signal, and wherein said signal switch routes said amplified signal from said high power amplifier to said directional antennas.

9. The base station of claim 1 further comprising control processor for generating a sector routing signal, and wherein said signal switch routes signals from at least one of said sector connections to each said directional antenna based on said sector routing signal.

10. The base station of claim 1 wherein said first predetermined number is three.

11. The base station of claim 10 wherein said radiation patterns project out from said antenna assembly at approximately 120 degrees from each other.

12. The base station of claim 1 wherein said second predetermined number is three.

13. The base station of claim 12 wherein said first predetermined number is six.

14. The base station of claim 1 further comprising said first predetermined number of high power amplifiers, wherein each high power amplifier is disposed between one of said directional antennas and said signal switch, and wherein each said high power amplifier receives an analog RF signal from said signal switch and amplifying said analog RF signal to produce an amplified signal.

15. The base station of claim 14 further comprising one or more CDMA finger demodulators for receiving a downconverted reverse link sample stream from said at least one of said sector connections and performing PN despreading of said downconverted reverse link sample stream to produce a PN despread reverse link signal.

16. The base station of claim 14 further comprising said first predetermined number of transmitters, wherein each transmitter is disposed between one of said high power amplifiers and said signal switch, for receiving a baseband signal from said signal switch and upconverting said baseband signal to produce said analog RF signal.

17. The base station of claim 14 further comprising control processor for generating a sector routing signal, and wherein said signal switch routes signals from at least one of said sector connections to each said directional antenna based on said sector routing signal.

18. The base station of claim 17 wherein said motor provides an angular position signal to said control processor, and wherein said sector routing signal is based on said angular position signal.

19. The base station of claim 17 wherein said Walsh code is a supplemental channel Walsh code.

20. The base station of claim 14 further comprising pseudonoise (PN) spreader for performing PN spreading of a first data signal to produce a PN spread signal, and for providing said PN spread signal to said at least one of said sector connections for routing by said signal switch.

21. The base station of claim 20 wherein said PN spreader is a real PN spreader for multiplying said first data signal by a real PN code.

22. The base station of claim 20 wherein said PN spreader is a complex PN spreader for multiplying said first data signal by a complex PN code.

23. The base station of claim 20 further comprising broad beam antenna, wherein said PN spreader further spreads a pilot signal to produce a PN spread pilot signal, and wherein said PN spread pilot signal is transmitted through said broad beam antenna.

24. The base station of claim 20 further comprising Walsh spreader for receiving a second data signal and multiplying it by a Walsh code to produce said first data signal.

25. A method of transmitting an information signal comprising:

routing one forward link signal of a first predetermined number of forward link signals to a first directional antenna of a second predetermined number of directional antennas, wherein said second predetermined number of directional antennas are assembled into an antenna assembly such that the radiation pattern of each of said second predetermined number of directional antennas is directed radially outward from the center of said antenna assembly, and wherein said routing is based on an angular position of said first directional antenna;

rotating said antenna assembly continuously in one direction; and transmitting said one forward link signal through a signal beam corresponding to said first directional antenna.

26. The method of claim 25 further comprising transmitting a pilot channel signal through a broad signal beam, wherein said pilot channel signal is coherent with respect to at least one of said first predetermined number of forward link signals.

27. The method of claim 25 further comprising routing said one forward link signal to a second directional antenna of said second predetermined number of directional antennas based on the sweeping of said signal beam over a boundary between two of said first predetermined number of sector coverage areas.

28. The method of claim 25 wherein said first directional antenna is a dish antenna.

29. The method of claim 25 wherein said first directional antenna is a collinear array antenna.

30. The method of claim 25 wherein said second predetermined number is greater than three.

31. The method of claim 25 wherein said second predetermined number is three.

32. The method of claim 31 wherein said directional antennas are directed radially outward from an axis at approximately 120 degree angles from each other.

33. The method of claim 25 wherein said first predetermined number is three.

34. The method of claim 33 wherein said first predetermined number is six.

35. The method of claim 25 further comprising pseudonoise (PN) spreading a PN despread signal to form said one forward link signal.

36. The base station of claim 35 wherein said PN spreading is real PN spreading, wherein said PN despread signal is multiplied by a real PN code.

37. The base station of claim 35 wherein said PN spreading is complex PN spreading, wherein said PN despread signal is multiplied by a complex PN code.

38. The method of claim 35 further comprising Walsh spreading a Walsh despread signal using a Walsh code to form said PN despread signal.

39. The method of claim 38 wherein said Walsh code is a supplemental channel Walsh code.

40. A method of receiving an information signal comprising:

receiving a first reverse link signal through a first signal beam corresponding to a first directional antenna of a first predetermined number of directional antennas, wherein said first predetermined number of directional antennas are assembled into an antenna assembly such that the radiation pattern of each of said first predetermined number of directional antennas is directed radially outward from the center of said antenna assembly;

rotating said antenna assembly continuously in one direction; and routing, based on an angular position of said first predetermined number of directional antennas, said first reverse link signal to a finger demodulator through a first sector connection of a second predetermined number of sector connections.

41. The method of claim 40 further comprising adjusting said routing of said first reverse link signal such that it is routed through a second sector connection when said signal beam sweeps over the boundary between two of said second predetermined number of sector coverage areas.

42. The method of claim 40 wherein said one directional antenna is a dish antenna.

43. The method of claim 40 wherein said one directional antenna is a collinear array antenna.

44. The method of claim 40 wherein said first predetermined number is greater than three.

45. The method of claim 40 wherein said first predetermined number is three.

46. The method of claim 45 wherein said first predetermined number of directional antennas are directed radially outward from an axis at approximately 120 degree angles from each other.

47. The method of claim 40 wherein said second predetermined number is three.

48. The method of claim 47 wherein said first predetermined number is six.

49. The method of claim 40 further comprising pseudonoise (PN) despreading said first reverse link signal to form a PN despread signal.

50. The base station of claim 49 wherein said PN despreading is real PN despreading, wherein said first reverse link signal is multiplied by a real PN code.

51. The base station of claim 50 wherein said PN despreading is complex PN despreading, wherein said first reverse link signal is multiplied by a complex PN code.

52. The method of claim 50 further comprising Walsh despreading said PN despread signal using a Walsh code to form a Walsh despread signal.

53. The method of claim 52 wherein said Walsh code is a supplemental channel Walsh code.

* * * * *